June 25, 1963 E. M. WARNER ETAL 3,095,570
MINE HAULAGE VEHICLE
Filed April 3, 1959 3 Sheets-Sheet 1
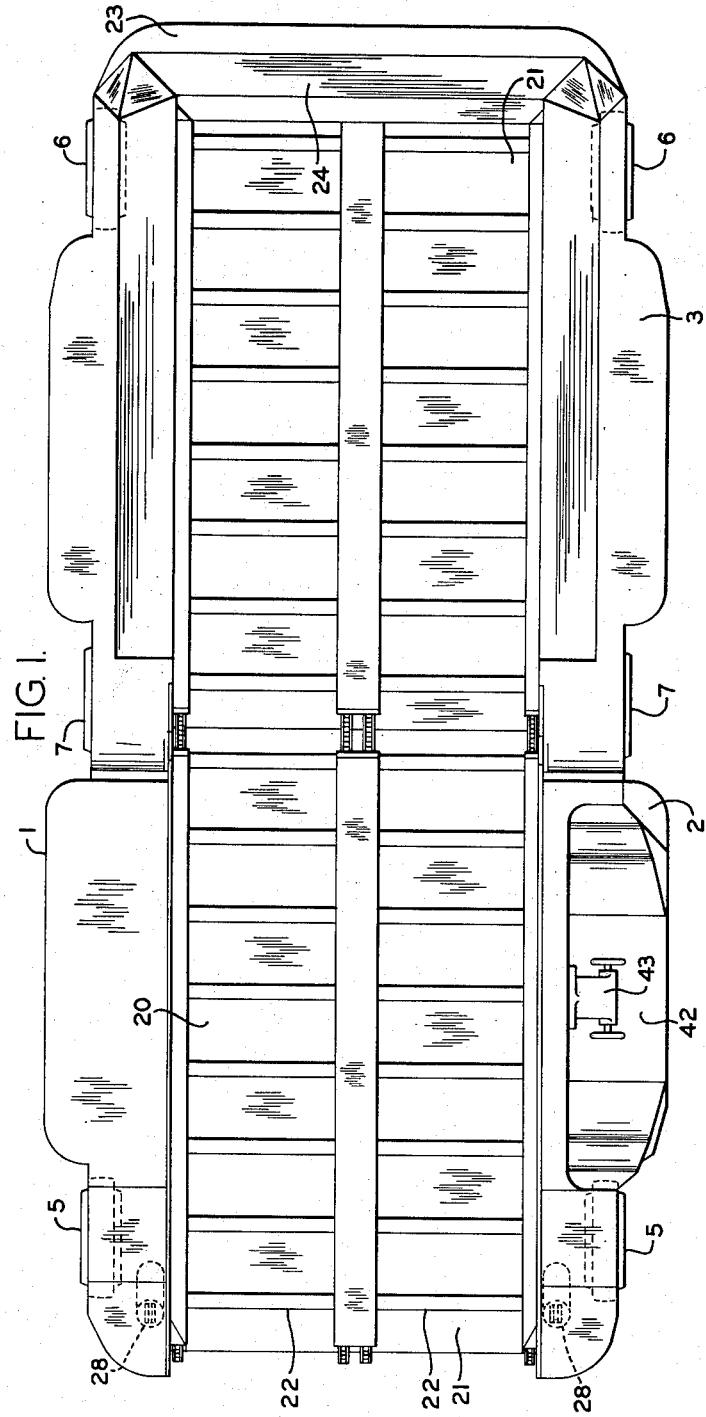
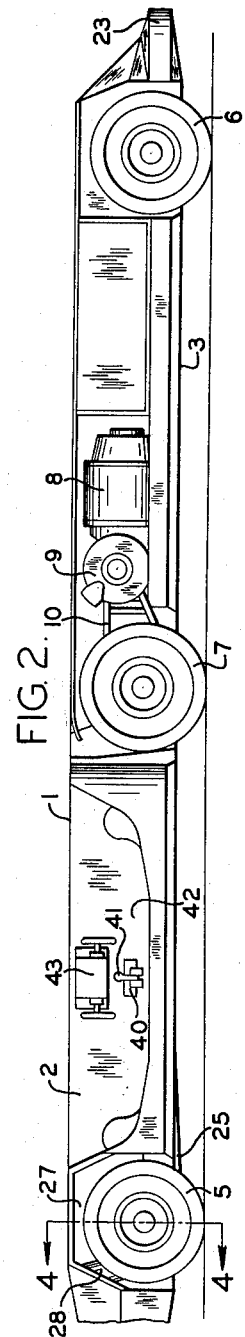
INVENTORS:
EDMUND M. WARNER
PAUL R. JOHNSON
BY
ATTORNEY.

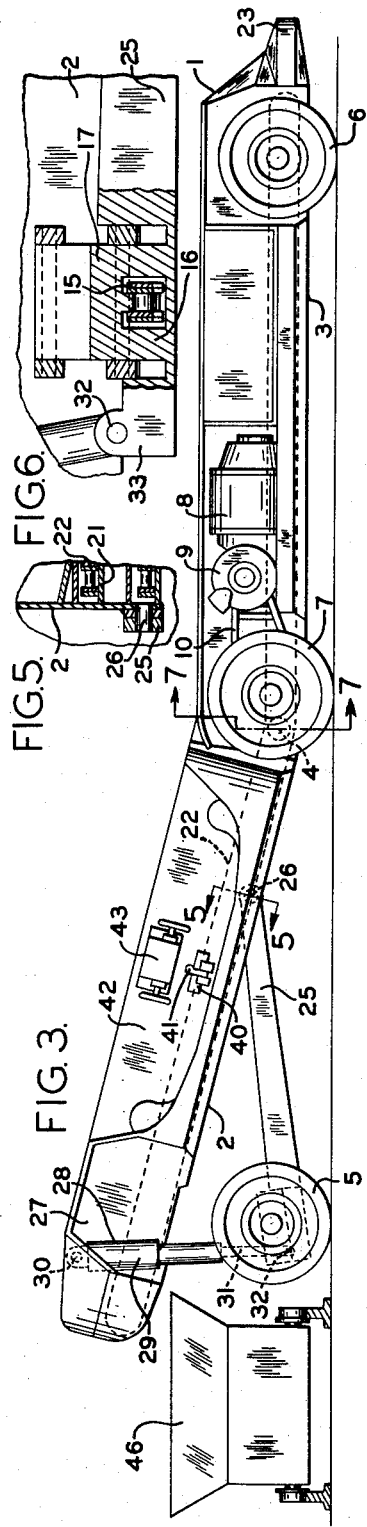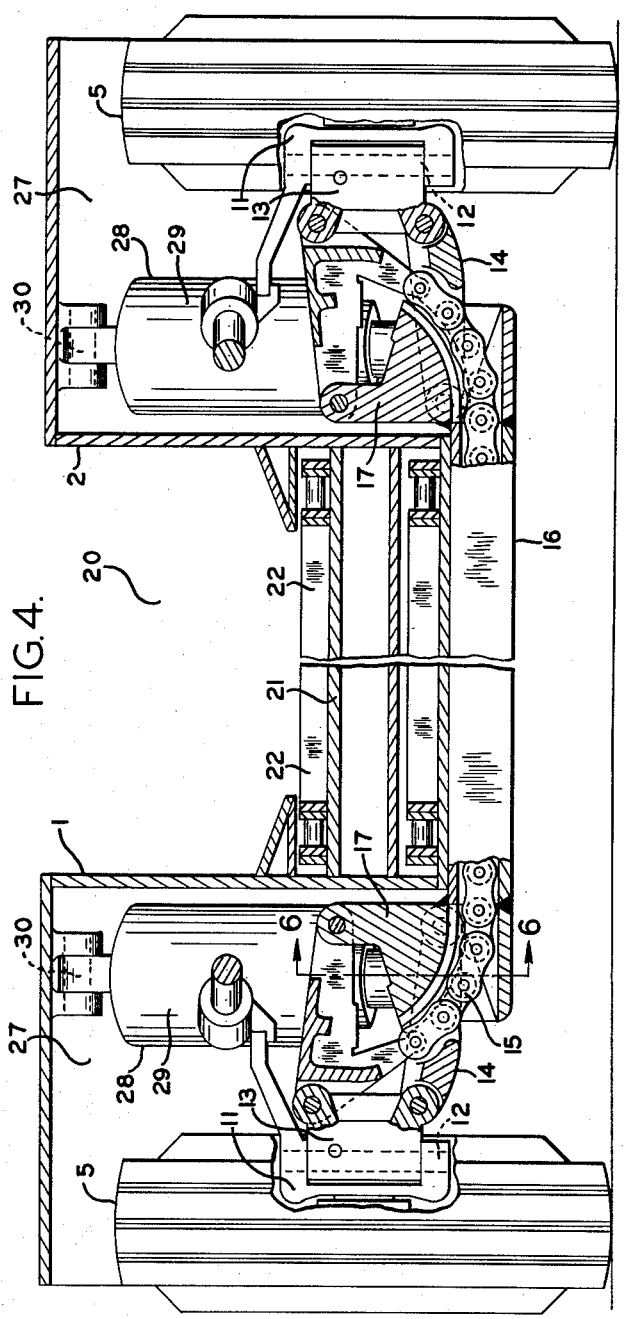

June 25, 1963

E. M. WARNER ETAL 3,095,570

MINE HAULAGE VEHICLE

Filed April 3, 1959

INVENTORS:
EDMUND M. WARNER
PAUL R. JOHNSON
BY
*Charles F. Osgood*
ATTORNEY.

United States Patent Office 3,095,570
Patented June 25, 1963

3,095,570
MINE HAULAGE VEHICLE
Edmund M. Warner and Paul R. Johnson, Franklin, Pa., assignors to Joy Manufacturing Company, Pittsburgh, Pa., a corporation of Pennsylvania
Filed Apr. 3, 1959, Ser. No. 804,011
2 Claims. (Cl. 214—83.36)

This invention relates to mine haulage vehicles of the type commonly known as shuttle cars and more particularly to improved tilting mechanism for elevating the discharge end of the car body especially in a shuttle car of the articulated frame six-wheeled type.

In a shuttle car of the articulated frame six-wheel type, such as that disclosed in a copending application to John D. Russell, Serial No. 681,004, filed August 29, 1957, now Patent No. 2,962,176, owned by the assignee of the present invention, the car is run up along a ramp to tilt one section of the articulated car body to elevate the discharge end of the car. In a copending Hoover and Woolf application, Serial No. 740,829, filed June 9, 1958, now Patent No. 2,970,664, also of common ownership, mechanism is disclosed for raising and lowering the end sections of the articulated car body a slight distance relative to the wheels. The present invention contemplates improvements over such known types of shuttle cars in that improved remotely controlled power operated tilting mechanism is provided between a wheel mounting and the car body for elevating a pivoted section of the car body a substantial distance relative to the adjacent wheels to provide an elevated discharge for the car conveyor thereby eliminating any need for a ramp. In accordance with the present invention the improved power operated tilting mechanism for the articulated section of the car body is remotely controlled from a control means located at the operator's station on the car.

It is therefore a primary object of the present invention to provide an improved mine haulage vehicle having improved remotely controlled means for tilting an articulated section of the car body to vary the discharge height of the car. Another object is to provide an improved shuttle car of the articulated frame six-wheeled self-unloading type having end steering wheels and centrally located traction wheels, provided with improved remotely controlled mechanism arranged between the mounting for a pair of end steering wheels and the car body for tilting an articulated section of the car body to vary the discharge height of the car. These and other objects and advantages of the invention will, however, hereinafter more fully appear.

In the accompanying drawings there is shown for purposes of illustration one form which the invention may assume in practice.

In these drawings:

FIG. 1 is a plan view of a shuttle car of the articulated frame six-wheeled type in which an illustrative form of the invention is embodied.

FIG. 2 is a side elevational view of the shuttle car shown in FIG. 1.

FIG. 3 is a side elevational view similar to FIG. 2 showing the front section of the articulated car body tilted upwardly to elevate the discharge height of the car.

FIG. 4 is an enlarged cross-sectional view taken on line 4—4 of FIG. 2, showing the mounting for the front steering wheels.

FIG. 5 is a detail vertical section taken on line 5—5 of FIG. 3, showing the transverse pivot for the tiltable wheel mounting frame.

FIG. 6 is a detail longitudinal vertical section taken on line 6—6 of FIG. 4, showing a portion of the front wheel mounting.

Figure 7:
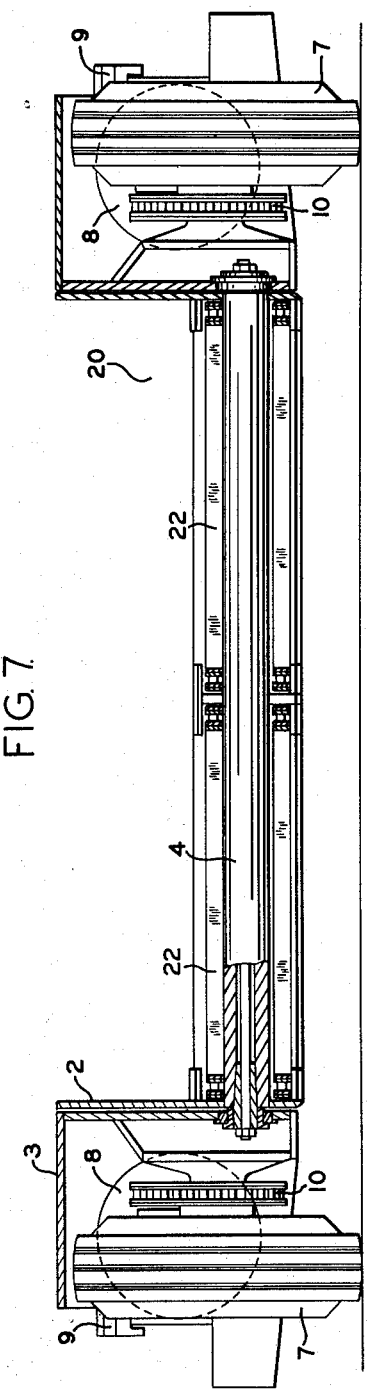
FIG. 7 is an enlarged cross-section taken on line 7—7 of FIG. 3, showing the transverse pivot between the articulated sections of the car body.

In this illustrative construction, as shown in the drawings, the invention is shown embodied in a mine haulage vehicle of the type known as a shuttle car especially designed for use in underground mines and is desirably similar to that disclosed in the John D. Russell application Serial No. 681,004, above referred to. Evidently the invention may be embodied in articulated frame type vehicles of other types.

The shuttle car generally comprises a vehicle body 1 of a relatively compact low height design generally rectangular in plan and comprising articulated body sections or frame parts 2 and 3 pivotally connected together at 4 (see FIG. 7) on a horizontal transverse axis. The articulated vehicle body is mounted on front and rear end steerable or dirigible wheels 5 and 6 and centrally located traction wheels 7, the latter desirably arranged with their axes located near or at the pivot between the articulated car body sections, as illustrated. Motors 8 carried by the body section 3 are operatively connected through conventional speed reducers 9 and endless drive chain connections 10 to the centrally located traction wheels 7. The end steerable wheels 5 and 6 are journaled on axles carried by axle frames 11 turnable on vertical pivot shafts 12 carried by brackets 13, and these brackets are desirably connected through a parallel motion link suspension mechanism 14 mounted at the sides of the car body as is fully disclosed in a copending application to John R. Sibley, Serial No. 681,007, filed August 29, 1957, likewise owned by the assignee of the present invention. This suspension system includes a flexible equalizer chain 15 connected between the upper links of the parallel motion suspension mechanism and extending transversely across the vehicle through a cross connecting portion in the form of a tubular member 16 secured to side supports 17 and extending beneath the car body. The parallel motion links 14 are pivotally mounted on the side supports 17, as shown. Any suitable steering mechanism may be operatively connected to the end steerable wheels to effect steering of the vehicle and since such steering mechanism does not per se enter into the present invention further description thereof is deemed unnecessary.

As is disclosed in the above mentioned Russell application Serial No. 681,004 the car body has extending lengthwise thereof a material receiving compartment 20 and the articulated sections of the car body have bottom plates 21 which cooperate to provide the articulated bottom of the material receiving compartment. Extending longitudinally along the bottom of the compartment are parallel endless cross flight conveyors 22 having their top runs moving along the top surfaces of the bottom plates 21 for moving material within the compartment during the loading operation and for discharging the material from the compartment at the front discharge end of the car 1 during unloading. Arranged at the outer end of the rear body section 3 is a transverse bumper frame 23 having a top deck 24 over which loading of the compartment takes place. The top and bottom runs of the conveyor chains extend above and below the pivot 4 between the articulated body sections, as shown in FIG. 7.

Now referring to the improved tilting mechanism of the articulated body section for elevating the discharge height of the conveyors at the front end of the vehicle it will be noted that the transverse frame structure of the front steering wheel mounting is secured to a pivoted frame 25 pivotally connected at 26 on a transverse axis to the sides of the body section 2 so that as the body section is tilted upwardly about its pivot 4 relative to the rear body section 3, as shown in FIG. 3, the pivoted wheel mounting frame 25 may swing about its pivotal connection 26 with the car body. Arranged within spaces 27 at the sides of the car body section 2, within which spaces the front steering wheels are located, there are positioned upright extensible jack devices 28 herein desirably hydraulic jacks having fluid cylinders 29 pivotally connected at their upper ends at 30 to the upper portion of the car body. These fluid jacks are desirably of the double telescopic fluid type and the lower piston rods 31 are pivotally connected at 32 on brackets 33 integral with the transverse wheel mounting for the front wheels, as shown in FIG. 6.

Figure 8:
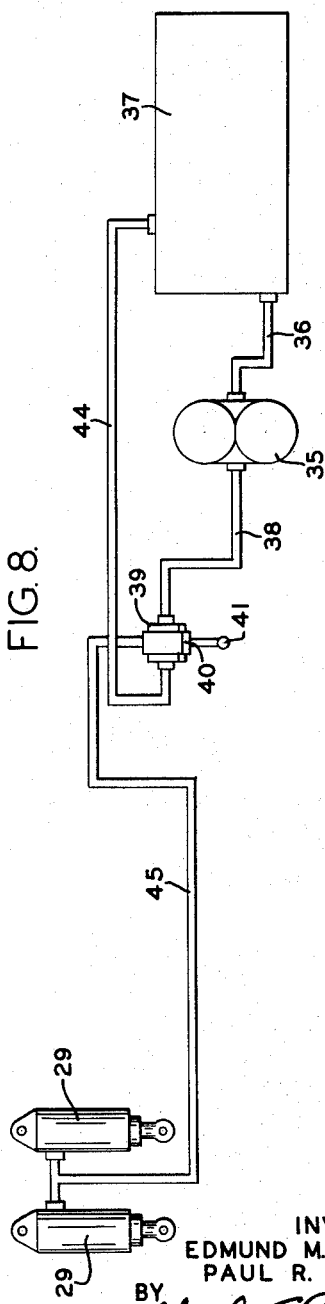
FIG. 8 is a diagrammatic view showing the hydraulic fluid system.

As shown diagrammatically in FIG. 8 a pump 35 may be driven in any suitable manner, herein for example by one of the motors 8, and the suction side of this pump is connected by a conduit 36 to a liquid tank 37. The discharge side of the pump is connected by a conduit 38 to the pressure passage of a valve box 39 of a conventional control valve mechanism. This valve box has a bore for containing a conventional slide valve 40 having a suitable operating handle 41 and the valve mechanism is desirably conveniently located within the operator's station 42 on the vehicle in adjacency to the steering control device 43. The valve box has a return conduit 44 leading back to the fluid tank and a pressure conduit 45 extends from the valve box to the cylinders 29 of the fluid jacks 28.

During traveling of the shuttle car about the mine the articulated body section 2 is in lowered position resting down against the transverse frame member 16, as shown in FIGS. 2 and 4, and the vehicle may be propelled about the mine by the motors 8 driving the centrally located traction wheels 7, and steering of the car may be effected by the end steerable wheels 5 and 6. When it is desired to discharge the material from the body compartment into a mine car 46, or other transportation means, the operator may manipulate the handle 41 of the control valve to supply fluid under pressure ot the jack cylinders 40 thereby to extend the jacks to tilt the front section 2 of the car body upwardly about its pivot 4 relative to the rear body section, as shown in FIG. 3, thereby to raise the discharge ends of the conveyors a substantial distance above the front steerable wheels 5 in the manner shown. When the front body section is in this upwardly tilted position the conveyors may be driven to effect discharge of the contents of the body compartment into the waiting mine car or other transportation means. When discharge of the load of material is effected the jack cylinders may then be vented by the control valve to bring the front body section 2 downwardly into its horizontal position shown in FIGS. 2 and 4 with the forward portion of the body section resting against the cross portion 16 of the swingable wheel frame 25.

As a result of this invention an improved mine shuttle car of the articulated frame six-wheeled type is provided having improved tilting mechanism operatively connected to one articultaed body section for tilting the latter relative to the other body section to elevate the discharge end of the car. By operatively associating the swingable wheel mounting frame and tilting jack devices with respect to the articulated body section in the manner disclosed not only may the discharge end of the car be quickly and easily elevated but also a relatively compact and rugged construction is obtained. These and other advantages of the invention will be clearly apparent to those skilled in the art.

While there is in this application specifically described one form which the invention may assume in practice, it will be understood that this form is shown for purposes of illustration and that the invention may be modified and embodied in various other forms without departing from its spirit or the scope of the appended claims.

What we claim as new and desire to secure by Letters Patent is:

1. A mine haulage vehicle comprising, a movable flexible conveying means, elongated body sections supporting said flexible conveying means, each body section supporting a portion of said conveying means wherein said conveying means extends for the entire length of said body sections, pivot means connecting said body sections at their adjacent ends in tandem for unrestrained pivotal action through an arc relative to each other, traction wheels located on one of said body sections adjacent said pivot means, a frame member pivotally mounted at one end to said one body section adjacent said pivot means, the other end of said frame member having steerable wheels mounted thereon for steering the one said body section, adjusting means secured to said steerable wheels and the end of said one body section which is adjacent thereto for elevating said end of said one body section for positioning said one body section for discharging material therefrom, and steerable wheels located at the end of the other of said body sections for steering said other body section.

2. An articulated mine haulage vehicle comprising a pair of interconnected body sections having all ends open with the adjacent ends open to each other to define a rigid passage floor in said body sections normally lying substantially in the same plane, said body sections have upwardly extending side portions, conveying means mounted in said body sections for cooperating with said floor passage for moving material over said floor and adapted to convey material continuously through said body sections, pivot means connecting said adjacent ends of said body sections for free pivotal movement through an arc relative to each other, traction wheels mounted on one of said body sections adjacent said pivot means, said one body section having dirigible wheels located at the open end of said section remote from said pivot means, a tilting mechanism mounted on the other open end of the other of said body sections for elevating said last mentioned end for discharging purposes, dirigible wheels connected to said tilting mechanism for supporting said last mentioned body section, and a frame member pivotally connecting said last mentioned dirigible wheels to said other body section adjacent said pivot means.

References Cited in the file of this patent

UNITED STATES PATENTS

| | | |
|---|---|---|
| 1,023,045 | Shipley | Apr. 9, 1912 |
| 1,399,130 | Lewis | Dec. 6, 1921 |
| 1,442,219 | Howe et al. | Jan. 16, 1923 |
| 1,821,438 | Levin | Sept. 1, 1931 |
| 2,663,375 | Caldwell | Dec. 22, 1953 |
| 2,685,450 | Beasley | Aug. 3, 1954 |
| 2,698,104 | Dudley | Dec. 28, 1954 |
| 2,962,176 | Russell | Nov. 29, 1960 |